Sept. 24, 1929.    A. KREBS    1,728,972
APPARATUS FOR USE IN WELDING METAL
Filed June 21, 1922    3 Sheets-Sheet 1
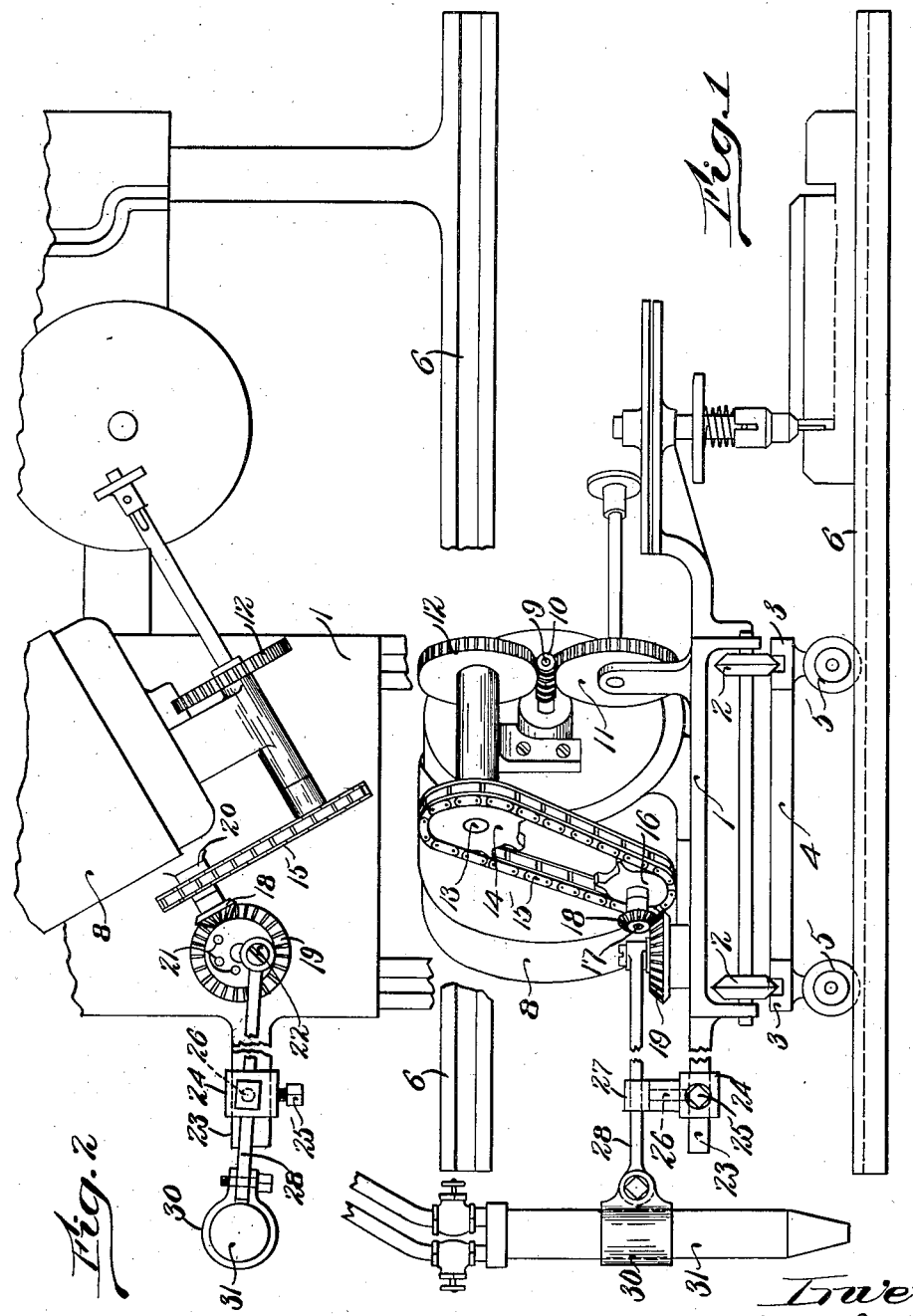

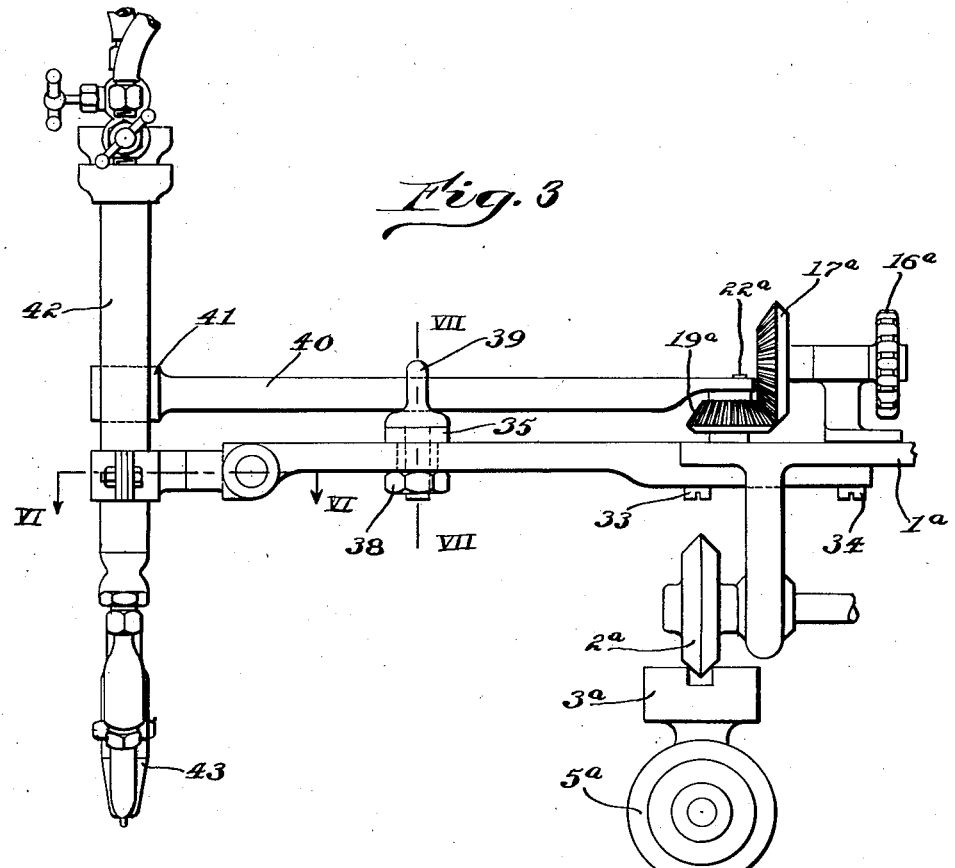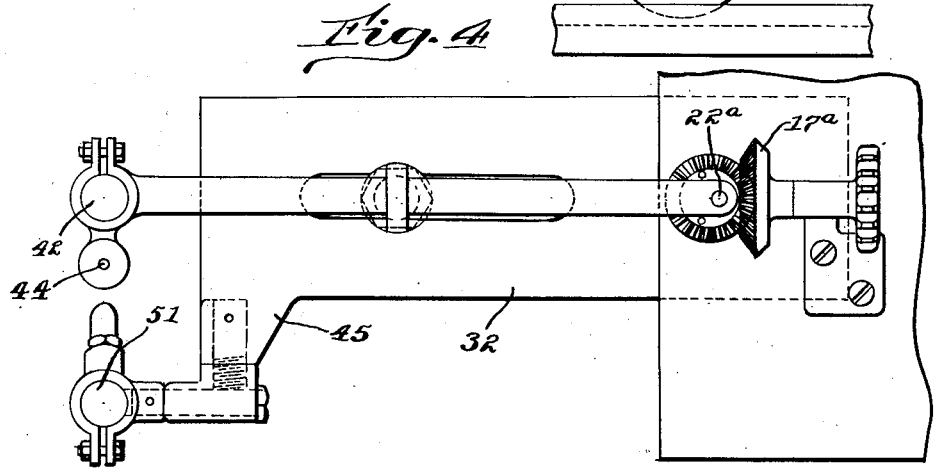

Sept. 24, 1929.    A. KREBS    1,728,972
APPARATUS FOR USE IN WELDING METAL
Filed June 21, 1922    3 Sheets-Sheet 3

Inventor:
Adolf Krebs.
by Roberts, Roberts & Cushman
Attys.

Patented Sept. 24, 1929

1,728,972

UNITED STATES PATENT OFFICE

ADOLF KREBS, OF BOSTON, MASSACHUSETTS

APPARATUS FOR USE IN WELDING METAL

Application filed June 21, 1922. Serial No. 570,005.

This invention relates to apparatus useful in the practice of welding metalic parts, and more particularly to a mechanism useful in the production of welded seams or joints in an automatic manner by the employment of heating appliances, such for example as the oxi-acetylene blow torch or the electric arc.

For the formation of a perfect welded seam or joint between metallic parts, by the use of a local heating appliance such as a blow torch or electric arc, certain well recognized conditions are requisite, among which may be mentioned the preheating of the pieces along the line of the joint substantially to the fusion point; the heating of the pieces to be joined for a substantial distance to either side of such joint; the heating of the welding material employed in forming the joint to the fusing point; the prevention of the oxidizing action of the air upon the heated materials, and the stirring or puddling of the molten metal at the welding point such as to insure actual molecular cohesion of the metal of the parts to be united. In my Patent No. 1,475,189, dated November 27, 1923, I have disclosed a heating appliance which is eminently suitable for producing the above conditions in the formation of a joint and when properly controlled in its movements, capable of forming a joint of a type which is more nearly perfect than any which has heretofore been commonly attained. In the forming of welded joints by hand operated implements however, it is almost impossible to maintain uniformity in conditions such as to insure the production of sound joints under all circumstances, even with the best of appliances. It has been shown by extensive tests, as for example those made at the Bureau of Standards at Washington during the year 1920, that the same operator, working under conditions made as nearly identical as possible and with manually controlled appliances, finds it almost impossible to obtain uniformity in results. This may be due in part perhaps to the failure of the operator to recognize the proper fusing point at which union of the parts will take place, his inability to move the heating appliances at a uniform speed along the work so as to bring the work to the same temperature at all points, thus resulting in the production of spots in the seam where the parts are either burned or not properly united, or in some cases by his failure to heat the parts to a sufficient distance to each side of the steam to ensure a perfect cohesion thereof. In order to eliminate the human element in the operation of such devices it has hereto been proposed to employ mechanical means under the direction of suitable pattern controlled mechanism for supporting the torch and for moving it at a uniform rate along the seam, and when a torch such as disclosed in the aforesaid application is applied to one of such usual mechanical devices, it is found that with proper care, substantially perfect joints may be produced upon any material such for example as brass, copper, cast iron, etc., which, when fused, flows freely. When however, the ordinary torch or even a torch of the type above referred to, is employed in a welding machine of the usual character for the welding of heavy work, particularly when the material is not easily fusible, as for example steel or wrought-iron, and where, when fused, the material is viscous in its nature, such arrangement cannot be depended upon to produce as perfect a joint as is desirable, as it is necessary when dealing with such materials to heat the parts to a considerable distance to either side of the seam in order to cause uniform cohesion at the line of the joint. In order to produce such lateral heating it is substantially necessary that the torch or other heating appliance be moved regularly and for a substantial distance from one side of the joint to the other, such movement not only distributing the heat, but also apparently causing the torch flame to exert a mechanical action upon the fused material tending to mix or puddle the welding material with the material of the parts to be joined. When a self-feeding heating appliance such as is disclosed in my aforementioned patent is employed, this mechanical mixing or puddling of the molten metal is greatly accentuated due to the pressure of the lower end of the bar of welding material upon the heated part of the metal to be united. Preferably the movement given the heating appliance is such as to cause it to move in a more or less spiral path in traveling along the joint, the path consisting of a series of overlapping circles or ellipses. The usual welding machine, however, fails to provide for such movement, merely causing the heating appliance to move along the line of the seam and heating the parts but a little distance to either side thereof.

An object of the invention is accordingly to provide for the automatic movement of a heating appliance along a seam to be united in such manner as to ensure proper and uniform conditions along such seam for the production of a perfect welded joint regardless of the size or character of the parts which are being joined, or the character of the material forming.

In carrying this object into effect it is preferred to employ a mechanism of the general type disclosed in my Patent No. 1,544,655, dated July 7, 1925, wherein there is shown a carriage arranged for universal movement in a horizontal plane and accurately controlled in its movements by a template device of predetermined contour. In accordance with the present invention the carriage will have mounted thereon a suitable support for a heating appliance, such for example as a blow torch, which is so mounted as to permit it to move relatively to the support for describing a series of circles or ellipses, together with means mounted upon the carriage and operative simultaneously to impart such movement of the torch and to move the carriage in such manner as to carry the torch bodily along the line of the seam. Preferably also the carriage is provided with a second support upon which an auxiliary and relatively stationary torch is mounted, this latter torch being arranged to move in advance of the first torch along the line of the seam for preheating the work immediately at the seam. With this arrangement the latter torch serves to bring the work adjacent to the seam substantially to the fusing point while the first or movable torch, by its oscillating or vibrating movement, acts to heat the metal for a considerable distance along either side of the seam. If such latter torch be of the type disclosed in my Patent No. 1,475,189, dated November 27, 1923, the welding material will automatically be fed through the center of such torch to the proper point relatively to the seam so that the welding material will be fused with the desired rapidity and supplied in a uniform manner to the joint. With this construction, as the carriage moves along, the welding material feeds slowly down as its lower end is fused so that it is unnecessary for the operator of the machine to pay any attention to the application of such welding material to the joint. With such an arrangement the lower end of the welding bar which bears with considerable pressure upon the work to be united and which is surrounded by a pool of molten metal acts mechanically to mix or puddle such metal as it moves back and forth across the joint, thus producing an intimate cohesion of the molecules of metal of the parts to be united in a manner somewhat like that produced by a forging operation.

When an electric arc is employed instead of a torch, the construction and operation will be generally similar to that above described. By the employment of an arrangement such as above suggested, perfect joints may be obtained in a uniform manner, even though the line of the seam be of complex contour, and by reason of the automatic character of the mechanism it is made possible for a single operator to care for a number of machines, thus very materially reducing the cost of production of the finished work while at the same time very greatly improving its quality.

In the accompanying drawings there is illustrated by way of example an arrangement of parts well suited for attaining the above objects, but it is to be understood that the invention is not in any manner limited to such arrangement but contemplates as within its spirit any and all rearrangements and modifications of parts such as may be found useful in attaining the desired results.

In the accompanying drawings;

Fig. 1 is a side elevation of a machine constructed in accordance with the present invention;

Fig. 2 is a fragmentary plan view of the device shown in Fig. 1;

Fig. 3 is a fragmentary front elevation of the machine showing the same as adapted for supporting a double torch;

Fig. 4 is a plan view of the device shown in Fig. 3;

Figure 5:
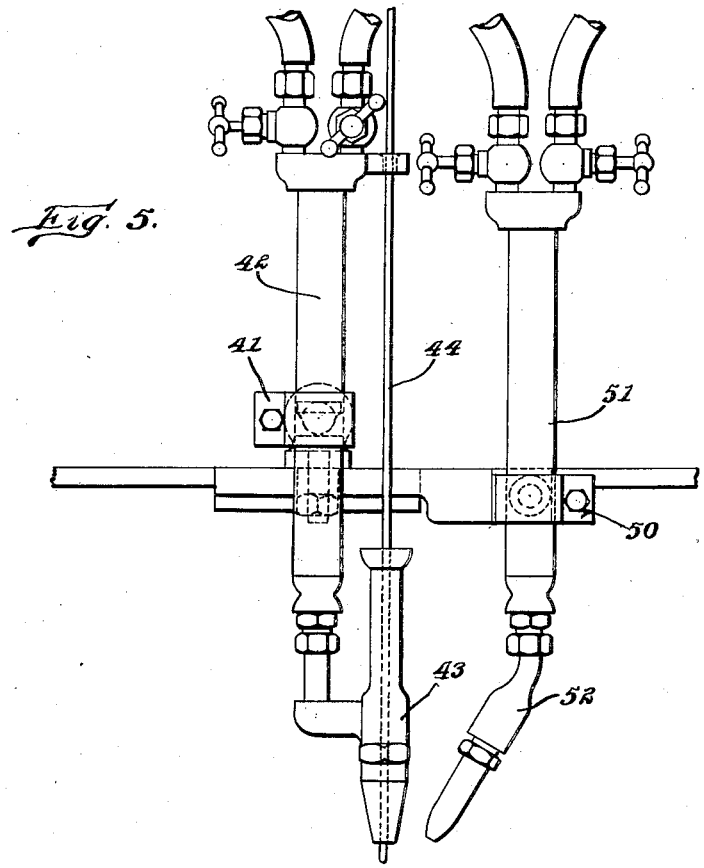
Fig. 5 is an end elevation of the left-hand side of the device as shown in Fig. 3.

Referring more especially to Figs. 1 and 2, a carriage 1 is shown as supported upon wheels or rollers 2. These wheels or rollers rest upon guide rails 3 carried by a second carriage 4, the latter being provided with wheels 5 by which it is supported upon rails 6. The rails 3 and 6 are arranged at right angles to each other so that the carriage 1 is capable of universal movement in a horizontal plane. An electric motor 8 is secured upon the carriage 1, this motor having a shaft 9 provided with a worm 10. With this worm engage the worm wheels 11, 12 respectively, being driven thereby. The worm wheel 10 serves as the actuating means for a template following and guiding device as described and illustrated in my Patent No. 1,544,655, dated July 7, 1925, such template following mechanism also serving to impart movement to the carriage such as to cause the latter to move in a predetermined path.

The worm wheel 12 is mounted on a shaft 13 to which a sprocket wheel 14 is fixed. A sprocket chain 15 is trained over this wheel and over a second sprocket wheel 16 mounted upon a shaft 17 having bearings in a bracket supported by the carriage. A bevel pinion 18 is fixed in the shaft 17 and meshes with a bevel gear 19 mounted to turn upon a vertical axle carried by a bracket 20. The pinion 19 constitutes a crank disc, having a plurality of openings such as 21 arranged at different distances from its axis. A crank pin 22 is adapted for selective engagement with any one of the openings 21.

Projecting laterally from one side of the carriage is an arm 23 to which a bracket 24 is secured by means of a set screw 25. This bracket is provided with an opening for the reception of a pin 26 projecting downwardly from a swivel member 27. This swivel member is provided with an opening for the reception and guidance of a connecting rod 28, one end of such rod being pivotally secured to the crank pin 22. This rod is free to slide axially in the opening in the member 27, while the pin 26 forms a fulcrum about which the connecting rod may turn. A torch holder 30 is secured to the outer end of the connecting rod 28, such holder serving for the reception of a torch or other heating appliance indicated at 31.

When in operation, the carriage 1 is compelled to move in a predetermined path by the template engaging follower so that the torch 31 describes a path similar to the contour of the template. In order, however, more widely to distribute the heating effect to the torch flame, the torch is caused to describe a series of ellipses or circles in moving back and forth across the line of its path of movement. This back and forth or vibratory movement of the torch is occasioned by rotation of the crank pin 22 which acts through the connecting rod 28 to move the torch in a series of closed curves which may take the form of circles or ellipses in accordance with the position of the bracket 24 with respect to the axis of the crank pin. In some cases, the major axes of such ellipses extend in the direction of the path of movement of the carriage while in other adjustments the major axes of said ellipses may extend transversely of such path. By changing the position of the crank pin 22, the amplitude of the vibrational movement of the torch may be varied.

Figure 7:
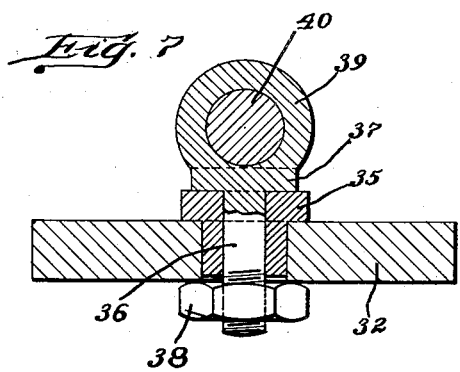
Fig. 7 is a transverse vertical cross section on the line 7—7 of Fig. 3.
Figure 6:
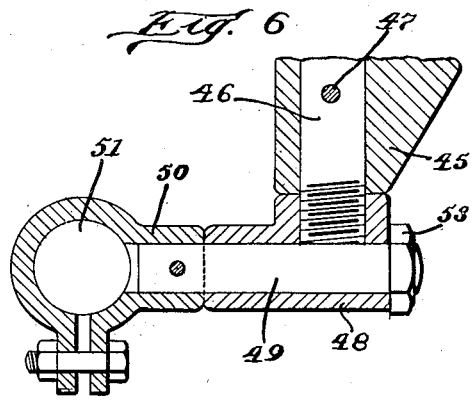
Fig. 6 is a fragmentary horizontal cross section on the line 6—6 of Fig. 3.

In Figs. 3 to 7 inclusive a somewhat modified arrangement is shown, particularly adapted for use with a double torch. In these views the carriage is indicated at 1ª, such carriage being provided with wheels such as 2ª resting upon rails such as 3ª, the latter, in turn, being provided with supporting wheels such as 5ª. A sprocket wheel 16ª, suitably driven by a motor mounted on the carriage, is fixed upon a shaft carried in a suitable bearing bracket secured to the carriage, such shaft also having fixed thereon a bevel pinion 17ª. This pinion meshes with a gear 19ª constituting a crank disc having openings for selective engagement by a crank pin 22ª. In this modified arrangement, the relatively narrow arm or support 23 shown as integral with the carriage in Figs. 1 and 2, is replaced by a wider supporting arm 32 secured to the under side of the carriage by means of bolts 33, 34. This support 32 is provided at a point intermediate its length with an opening in which a sleeve 35 is seated (Fig. 7). This sleeve provides a bearing for a pin 36 projecting downwardly from a swivel member 37, such pin being screw threaded at its lower end for the reception of a nut 38. The swivel member is provided with a head 39 having a bearing opening therein for the reception of a connecting rod 40. One end of this rod is pivotally mounted upon the crank pin 22ª while the opposite end is provided with a holder 41 which engages the supporting member 42 of a blow torch or other heating appliance indicated at 43. Preferably, this heating appliance is of the type disclosed in my Patent No. 1,475,189, dated November 27, 1923, and produces a flame of relatively large cross sectional area and preferably of annular form. When employing a torch of such type, the welding material, indicated as a bar 44, may be fed automatically downwardly through the center of the torch flame and into contact with the work.

The support 32 is provided, near its outer end and at its advancing edge, with an outstanding bracket 45 having an opening for the reception of a pin 46 secured in position by means of a bolt or screw 47. The pin 46 is screw threaded at its forward end and serves to support a bracket member 48 having an opening for the reception of a shaft 49. A holder 50 is secured to one end of this shaft, such holder engaging the supporting member 51 of a second torch or other heating appliance 52. The shaft 49 is screw threaded at its other end for the reception of a nut 53 by means of which the angular position of the shaft, with reference to the bracket 48, may be fixed. By loosening the nut 53, however, the torch 52 may be swung in a vertical plane.

In the normal position of the parts, both torches stand in the same vertical plane and in tandem relation, the torch 52 preceding the torch 43 in the movement of the carriage. The torch 52 is preferably so formed as to produce a relatively pointed jet of flame which is directed immediately against the joint between the parts to be united. The torch 43, on the other hand, produces a relatively wide flame and by its vibratory movement in a direction transverse of the line of the joint, serves to heat the parts to be united for a very considerable distance to either side of the joint. As the torch is moved along the seam and back and forth across the same, the end of the welding bar, which rests upon the work, is dragged over the same, its pressure as well as the tendency of its fusing and to adhere to the work serving thoroughly to mix and puddle the molten metal at the welding point as well as to spread it mechanically over and work it with the joint, thus securing a very uniform and thorough cohesion of the molecules of metal such as to produce a highly efficient joint.

The torch 52 serves to preheat the pieces to be united immediately at the joint, the pointed flame tending to enter deeply into the joint so that all danger of the formation of a superficial or surface union is eliminated. The mechanism thus described is accordingly capable automatically of forming substantially perfect welded joints regardless of the character of the material being operated upon.

While many of the advantages of the device as described may be secured by the use of a single torch of the ordinary type as shown in Figs. 2 and 3, it is preferred to use a double torch, and to employ the self feeding torch shown in my patent above referred to as the main heating elements. Moreover, while the heating device has herein been shown as a blow torch, it is to be understood that other types of heating appliances, such for example, as one using the electric arc as the heating means, might be substituted therefor. It is also clear that various changes in the form and arrangement of the several parts of the mechanism might well be made without departing from the spirit of the invention.

What I claim and desire to secure by Letters Patent of the United States is:

1. A machine of the class described comprising a blow torch and a supporting carriage therefor, a motor mounted upon the carriage, a crank disc turning about a vertical axis and driven by the motor, a crank pin carried by the disc, means connecting the crank pin and torch whereby to impart vibrational movement to the latter substantially transversely of its path, and means also driven by the motor for moving the carriage in a predetermined pattern-controlled path.

2. A machine of the class described comprising a carriage movable universally in a substantially horizontal plane, an elongate bar provided with means adjacent to one of its ends for supporting a torch, means mounted upon the carriage for supporting said bar at a point intermediate its length and arranged to permit longitudinal and oscillatory movement of the bar, a crank pin engaging the other end of the bar, a motor mounted upon the carriage and arranged to rotate the crank pin, and means actuated by the motor for moving the carriage to traverse the torch over the work along the line of the joint to be welded.

3. A machine of the class described comprising a carriage, a blow torch mounted thereon and movable relatively thereto, a crank disc having a plurality of openings therein arranged at different distances from its axis, a crank pin selectively engageable with either of said holes, a connecting rod for transmitting movement from the crank pin to the heating appliance, a motor on the carriage for driving the crank disk, and means actuated by the motor for moving the carriage to cause the torch to follow a predetermined path.

4. A welding machine comprising a carriage mounted for universal movement in a substantially horizontal plane, said carriage supporting a blow torch for fusing the material of the work pieces to be united along the line of the joint, said torch being provided with means for holding a bar of welding material in upright position with its lower end resting by gravity in the molten material of the work pieces, means for moving the torch and bar back and forth across the line of the joint whereby to puddle such molten material, and means for moving the carriage relatively to the work.

5. A welding machine comprising a heating appliance furnishing an annular flame, means for guiding a welding bar through the center of such flame in a fixed position relatively thereto, the end of the bar resting by gravity upon the work piece at the line of the joint and being heated to the fusing point simultaneously with the latter, and means for moving the heating appliance and welding bar both in the direction of the joint and back and forth across the same, whereby the bar acts to stir the molten metal and to force it into the joint.

6. A welding machine comprising a carriage movable universally in a substantially horizontal plane, the carriage being provided with a relatively fixed torch movable with the carriage along the line of the joint, an arm mounted upon the carriage to oscillate in a horizontal plane, a second torch mounted upon one end of the arm, and a power driven crank for oscillating the arm whereby to swing said second appliance back and forth across the joint, and means for moving the carriage along the joint whereby to cause said second appliance to describe a spiral path in moving along the joint.

7. A welding machine comprising a movable carriage, a blow torch carried thereby, said torch having a broad annular flame adapted to heat the work laterally of the joint, means for guiding a welding rod through the center of said flame and a preheating torch also mounted upon the carriage, said device being mounted for angular adjustment in the plane of the joint and serving to heat the work immediately at and within the joint.

8. A welding machine comprising a movable carriage and a pair of blow torches carried thereby and normally disposed in the vertical plane of the joint in the work to be united, one of said torches being angularly adjustable in said plane, and the other of said torches being movable transversely of such plane, said torches being supported at a fixed distance from the work at all times.

Signed by me at Boston, Massachusetts, this 5th day of June, 1922.

ADOLF KREBS.